United States Patent
West et al.

(10) Patent No.: US 6,934,754 B2
(45) Date of Patent: *Aug. 23, 2005

(54) METHODS AND APPARATUS FOR PROCESSING NETWORK DATA TRANSMISSIONS

(75) Inventors: William B. West, Salt Lake City, UT (US); Wallace Eric Smith, Lindon, UT (US)

(73) Assignee: iBAHN General Holdings, Inc., South Jordan, UT (US)

( * ) Notice: Subject to any disclaimer, the term of this patent is extended or adjusted under 35 U.S.C. 154(b) by 918 days.

This patent is subject to a terminal disclaimer.

(21) Appl. No.: 09/823,088

(22) Filed: Mar. 29, 2001

(65) Prior Publication Data

US 2001/0037391 A1 Nov. 1, 2001

Related U.S. Application Data

(60) Provisional application No. 60/194,354, filed on Apr. 3, 2000.

(51) Int. Cl.[7] ............................................. G06F 15/173
(52) U.S. Cl. ....................... 709/225; 709/220; 709/223; 709/224; 709/226; 370/401; 370/475
(58) Field of Search ........................ 709/220, 223–226, 709/230, 238, 245, 249; 370/401, 475, 351–356, 389, 254

(56) References Cited

U.S. PATENT DOCUMENTS

| | | | |
|---|---|---|---|
| 5,790,548 A | * 8/1998 | Sistanizadeh et al. ....... | 370/401 |
| 5,793,763 A | 8/1998 | Mayes et al. ................ | 370/389 |
| 5,812,819 A | * 9/1998 | Rodwin et al. ............... | 703/23 |
| 5,835,725 A | * 11/1998 | Chiang et al. .............. | 709/228 |
| 6,052,725 A | * 4/2000 | McCann et al. ............. | 709/223 |
| 6,058,431 A | * 5/2000 | Srisuresh et al. ........... | 709/245 |
| 6,061,349 A | 5/2000 | Coile et al. ................. | 370/389 |
| 6,118,768 A | 9/2000 | Bhatia et al. ............... | 370/254 |
| 6,128,657 A | 10/2000 | Okanoya et al. ............ | 709/224 |
| 6,393,017 B1 | * 5/2002 | Galvin et al. ............... | 370/352 |
| 6,614,774 B1 | * 9/2003 | Wang ......................... | 370/338 |
| 6,738,382 B1 | * 5/2004 | West et al. ................. | 370/401 |

FOREIGN PATENT DOCUMENTS

EP          1017208 A2  *  7/2000  ........... H04L/29/12

* cited by examiner

*Primary Examiner*—Bharat Barot
*Assistant Examiner*—Liang-che Wang
(74) *Attorney, Agent, or Firm*—Beyer Weaver & Thomas LLP

(57) ABSTRACT

Methods and apparatus are described for providing access to a network via a first one of a plurality of network access nodes in the network. The network access nodes each have a network address associated therewith which is unique on the network, the first network access node having a first network address associated therewith. The first network address is associated with a first computer while the first computer is connected to the first network access node thereby providing access to the network. Transmissions associated with the first computer are monitored to determine address information. The transmissions are then processed in response to the address information.

25 Claims, 8 Drawing Sheets

METHODS AND APPARATUS FOR PROCESSING NETWORK DATA TRANSMISSIONS

RELATED APPLICATION DATA

The present application claims priority from U.S. Provisional Patent Application No. 60/194,354 for METHODS AND APPARATUS FOR TAGGING HTML TRAFFIC filed on Apr. 3, 2000, the entire disclosure of which is incorporated herein by reference for all purposes.

BACKGROUND OF THE INVENTION

The present invention relates to network communications and, more specifically, to methods for monitoring, tagging, and redirecting traffic in network communication systems.

Any business traveler who relies on network communications to maintain contact with clients and the home office appreciates the availability of fast and reliable data ports at remote locations such as airport lounges and hotel rooms. The hospitality industry has only recently begun to understand the necessity of providing such high speed data connections to business travelers. In fact, given the explosive growth of network technologies and the corresponding dependence of the business professional on such technologies, hotels which do not move to provide high speed connectivity in guest rooms comparable to the typical office environment will likely lose a substantial portion of their business to hotels which do.

Unfortunately, many hotel rooms are not currently wired to accommodate high speed data traffic. That is, prior to 1990, virtually all hotel rooms were wired to provide only basic telephone service. As late as 1995, less than 10% of hotel rooms were wired to handle standard Ethernet data speeds. Even today, while the major players in the hospitality industry are searching for high speed connectivity solutions, the vast majority of hotel guest and conference rooms are still wired with low quality, single pair connections. One obvious solution would be to completely rewire all of the guest and conference rooms in each hotel facility to provide the desired data transmission capabilities. However, given the prohibitive cost of such an undertaking, a less costly solution would be desirable.

Even if such a costly rewiring were undertaken, there are other problems which are not addressed by an infrastructure upgrade. For example, even if a high speed connection to the hotel's host is provided, it will often be the case that a guest's laptop computer would be incompatible with the hotel network in some way. Thus, each guest's laptop must be configured appropriately in order to communicate with the network and with the Internet beyond. This would likely involve loading special software onto a guest's laptop each time the guest wants to go online. Not only would such a process be cumbersome and annoying to the hotel guest, it may also be unacceptable from the guest's point of view in that reconfiguring the laptop may interfere with the current configuration in undesirable ways.

Neither does a costly wiring upgrade address the administrative and security issues related to providing Internet access via a hotel host. That is, high speed Internet access for hotel guests requires a network at the hotel property and some sort of connection between the hotel network and the Internet, e.g., a T1 or T3 line. A firewall at each hotel property would also be required to protect the internal network from unauthorized access. The existence of the firewall at each property, in turn, requires that most of the control and administration of the local network be performed at the hotel property rather than remotely, thus representing an undesirable redundancy of administrative functions.

Another administrative difficulty related to maintaining each hotel property as a separate Internet host involves the management of IP addresses. Ranges of globally unique 32-bit IP addresses are issued to organizations by a central Internet authority. These addresses are organized in a four octet format. Class A IP addresses are issued to very large organizations and employ the first of the four octets to identify the organization's network and the other three to identify individual hosts on that network. Thus, a class A address pool contains nearly 17 million ($2^{24}$) globally unique IP addresses. With class B addresses, the first two octets are used to identify the network and the last two to identify the individual hosts resulting in 64,000 ($2^{16}$) globally unique IP addresses for each organization. Finally, with class C addresses, the first three octets are used to identify the network and the last octet to identify the individual hosts resulting in only 256 ($2^8$) globally unique IP addresses for each organization.

Unfortunately for many medium to large size organizations (1,000 to 10,000 hosts), it has become very difficult, if not impossible, to obtain anything other than a class C address for their networks due to the fact that the class A and B address spaces have been almost entirely locked up. This problem has been addressed to some extent by the use of a Network Address Translation (NAT) protocol. According to such a protocol, when a local host on an organization's network requests access to the Internet, it is assigned a temporary IP address from the pool of globally unique IP addresses available to the organization. The local host is identified by the globally unique address only when sending or receiving packets on the Internet. As soon as the local host disconnects from the Internet, the address is returned to the pool for use by any of the other hosts on the network. For additional details on the implementation of such a protocol please refer to K. Evegang and P. Francis, *The IP Network Address Translator (NAT), Request for Comments "RFC" 1631*, Cray Communications, NTT, May 1994, the entirety of which is incorporated herein by reference for all purposes.

Such dynamic assignment of IP addresses might be sufficient for certain organizations as long as the number of simultaneous users which require access to the Internet remains below the maximum of 256. However, if, for example, a 1200 room hotel were hosting an Internet technologies seminar it would be extremely likely that the demand for Internet access would exceed the available address pool. All of this also assumes that a major hotel chain would be able to obtain a complete class C pool of addresses for each of its properties; not necessarily a reasonable assumption.

It is therefore desirable to provide methods and apparatus by which each of the properties in a major hotel chain may provide high speed Internet access to each of its guest rooms in a secure, inexpensive, and reliable manner without undue administrative burdens on the individual properties.

SUMMARY OF THE INVENTION

According to the present invention, methods and apparatus are provided which make use of existing hotel wiring infrastructures to provide secure, high speed data and Internet access to each of the guest rooms in a hotel property. According to one embodiment of the invention, each guest room in the hotel is interconnected via the hotel's current wiring infrastructure into a local network. When a guest wishes to access the Internet, he connects his laptop to an in-room module installed in each guest room which temporarily assigns a "fake" local IP address to the guest's laptop. The "fake" local IP address is associated with the in-room module and is unique on the hotel's local network. The address is "fake" in that it is not a valid Internet address and in that it replaces the laptop's own real IP address. The assigned local IP address uniquely identifies the guest's laptop on the hotel network while that laptop remains connected to the in-room module.

A headend module in the hotel handles packet routing and provides access to the Internet. In facilitating access to the Internet, the headend module temporarily assigns globally unique IP addresses from a pool of, for example, class C addresses to in-room modules in individual guest rooms in response to requests for Internet access from those rooms. An assigned IP address remains dedicated to a particular in-room module (and thus the associated guest's computer) for the duration of the Internet transaction. Upon termination of the transaction, the globally unique IP address is disassociated from the in-room module and put back into the pool for use in facilitating a later Internet transaction from any of the hotel's rooms.

According to another embodiment of the invention, the local networks of a number of hotels are interconnected via a remote server thereby forming a private wide area network, or a virtual private network. The operation of the virtual private network to provide high speed data and Internet access to individual guest rooms is similar to the process described above except that the "fake" IP address of the in-room modules are unique over the entire virtual private network, and the temporary assignment of globally unique IP addresses is performed by the remote server rather than the hotel headend. This is advantageous in that it is contemplated that the remote server has a larger pool of such addresses associated therewith than an individual hotel network might be able to procure (e.g., a class B address pool).

Thus, because the IP address needs of all of the hotels in the virtual private network are spread out over the entire installed base of the remote server, bursts of need at any one property which exceed the capacity of a single class C address pool may be accommodated. The virtual private network embodiment of the present invention also has the advantage that firewall security and other network administrative functions may be centralized and performed remotely without compromising the security of any individual hotel network.

According to various additional embodiments, the processing power of the in-room module of the present invention is employed to monitor the data being transmitted to and from the connected computer, and to provide a variety of functions based on the nature of the transmissions being monitored. For example, the in-room module may determine the destination of data transmissions from the computer by parsing and HTML string or looking at the TCP connection. Then, depending on the destination, the in-room module can perform various functions such as tagging the transmissions, framing pages sent to the computer in response to the transmission, or redirecting the transmissions for processing at some other location, e.g., an associated server.

Thus, according to the present invention, methods and apparatus are provided for providing access to a network via a first one of a plurality of network access nodes in the network. The network access nodes each have a network address associated therewith which is unique on the network, the first network access node having a first network address associated therewith. The first network address is associated with a first computer while the first computer is connected to the first network access node thereby providing access to the network. Transmissions associated with the first computer are monitored to determine address information. The transmissions are then processed in response to the address information.

A further understanding of the nature and advantages of the present invention may be realized by reference to the remaining portions of the specification and the drawings.

DESCRIPTION OF SPECIFIC EMBODIMENTS

Figure 1:
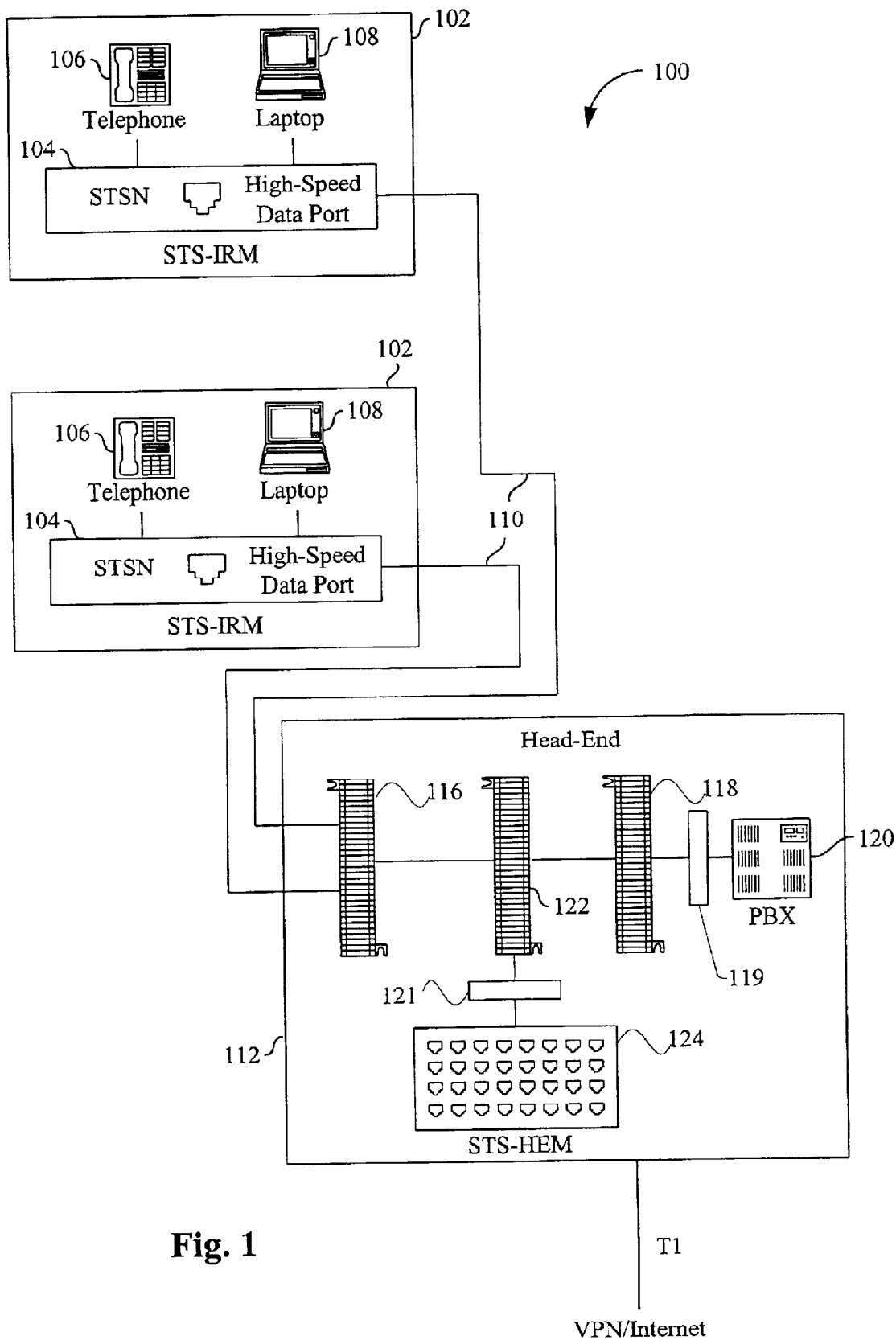
FIG. 1 is a block diagram illustrating the provision of high speed data and Internet access to guest rooms in a hotel according to a specific embodiment of the invention.

FIG. 1 is a block diagram illustrating the provision of high speed data and Internet access to guest rooms in a hotel network 100 according to a specific embodiment of the invention. In each guest room 102 is an in-room module (IRM) 104 by which a telephone 106 and a guest's laptop computer 108 may be connected to the hotel's wiring infrastructure. According to a specific embodiment, IRM 104 is plugged directly into the room's phone jack and has at least two additional ports, one for the room's telephone, e.g., an RJ-11 jack, and one for the guest's laptop, e.g., an RJ-45 Ethernet port. According to various embodiments, IRM 104 performs a number of functions including, for example, combining and separating Ethernet data and standard telephone signals for transmission over the hotel's wiring infrastructure. According to other embodiments and as discussed below, IRM 104 is configured to receive control information from a central location for automated control of various room environmental parameters, e.g., temperature and lighting. According to still other embodiments, IRM 104 is configured to receive a wide variety of other types of data such as, for example, digital audio and video for presentation in the guest room, or a wide variety of other information services.

Transmission line 110 connects IRM 104 to the hotel's head-end 112 via any of a wide variety of infrastructures. In the example shown, standard telephone transmission line 110 connects IRM 104 to head-end 112. It will be understood, however, that the wiring between IRM 104 and head-end 112 may take other forms such as, for example, a four-conductor Ethernet transmission line. Head-end 112 comprises a main distribution frame (MDF) punch down block 116, a public branch exchange (PBX) punch down block 118, and a public branch exchange (PBX) 120. Interposed between punch down blocks 116 and 118 is an HEM punch down block 122. Standard telephone signals pass through punch down block 122 to PBX 120 while half duplex Ethernet data packets are transmitted and received by head-end module (HEM) 124. This splitting of the telephone signals and data packets may be effected by any of a variety of filtering techniques as represented by filters 119 and 121. As will be understood, these filters may be incorporated into punch down block 122 or be separate devices. Additional filtering may also be provided to further mitigate undesirable effects from having voice and data on the same lines. Such filtering is also represented by filters 119 and 121. It will be understood that the configuration shown is merely for illustrative purposes and is not intended to limit the scope of the invention.

Depending on the configuration of the present invention, HEM 124 performs a variety of functions and, according to some embodiments, can be thought of as an enhanced router with additional capabilities programmed into its operating system. That is, according to such embodiments, HEM 124 serves as a switch which routes data packets to and from IRMs 104, and serves as the other end of the communications to and from IRMs 104 in which Ethernet data and phone signals are combined over single twisted pair technology. According to other alternative embodiments, HEM 124 handles address translation and assignment, controls network access, and serves as a bridge for Ethernet data transmitted over the hotel's single twisted pair infrastructure. HEM 124 has a plurality of ports 126 each of which communicates with a corresponding IRM 104. This communication may be individually monitored and controlled (by either the IRM or the HEM) thus allowing central hotel management of billing and access as well as the ability to generate reports for troubleshooting purposes.

Each IRM 104 (and thus the corresponding HEM port 126) has a fixed IP address which may be configured using any of a variety of network management protocols such as, for example, the Simple Network Management Protocol (SNMP). If the guest's computer connected to a particular IRM 104 does not have its own internal IP address, the fixed IP address of the corresponding IRM 104/HEM port 126 is assigned to the guest's computer using the Dynamic Host Configuration Protocol (DHCP) to facilitate access to network 100. If the guest's computer already has its own internal IP address, address translation is performed between the computer's internal IP address and the fixed IP address of the IRM 104/HEM port 126. According to various embodiment of the invention, this address translation may be performed by either IRM 104 or HEM 124. HEM 124 has a small boot ROM (not shown) for basic IP communications and a large flash ROM (not shown) for fully functional software and configuration data. This allows for remote software upgrades using, for example, an encrypted protocol riding on top of IP.

Figure 2:
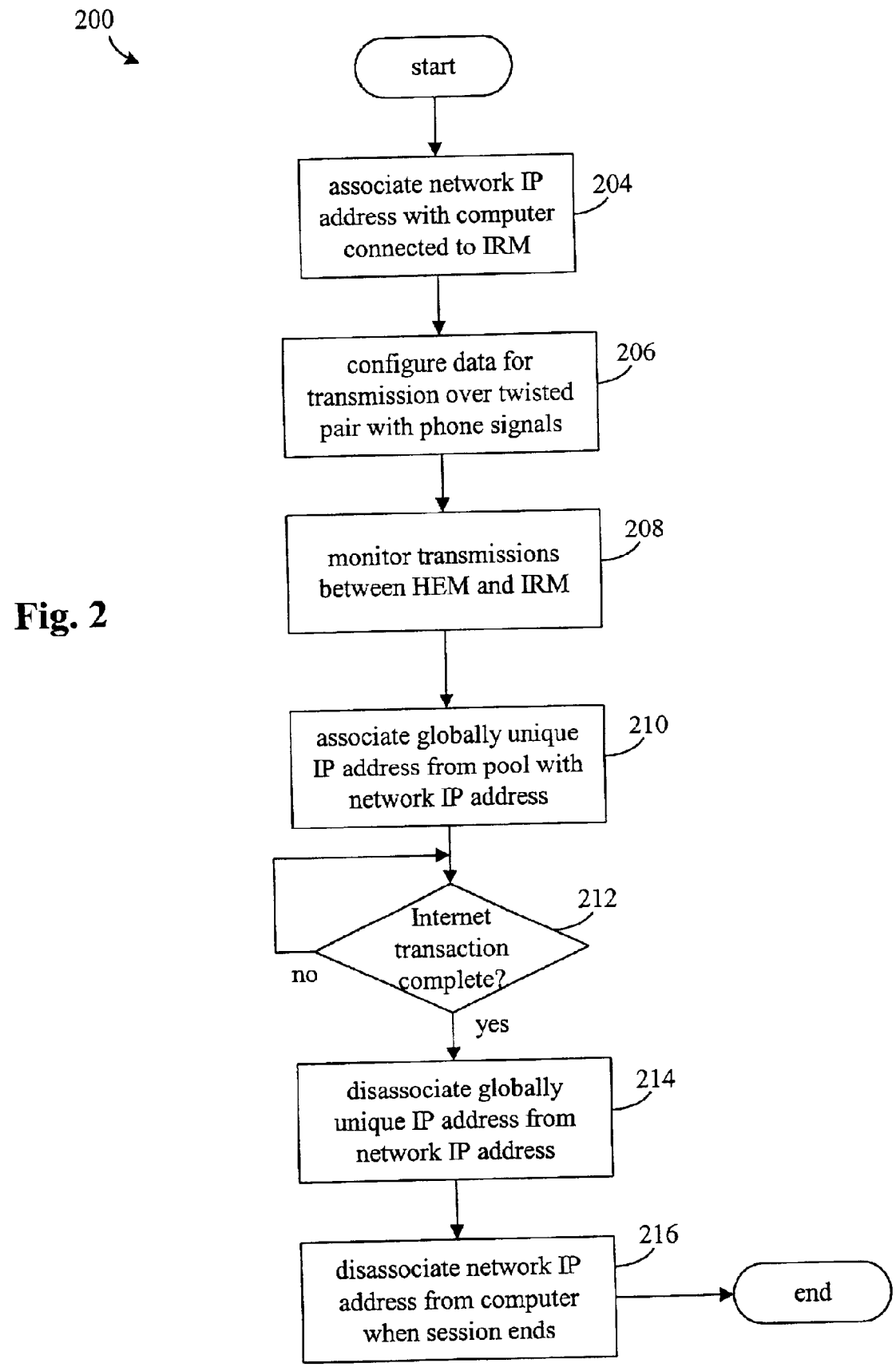
FIG. 2 is a flowchart illustrating a method for providing high speed data and Internet access to guest rooms in a hotel according to a specific embodiment of the invention.

FIG. 2 is a flowchart 200 illustrating a method for providing high speed data and Internet access to guest rooms in a hotel using the system of FIG. 1. When a guest's computer connects to an IRM in any one of the guest rooms, the network IP address associated with that IRM is associated with the computer (204). As discussed above, this association could mean a DHCP assignment of the network IP address to the guest's computer where the computer did not already have an internal IP address. It could also mean that the internal IP address of the computer is translated into the network IP address. This address assignment/translation may be effected by either the IRM or the HEM. In addition, it will be understood that depending on where the assignment/translation occurs it may precede or follow 206 described below. The network IP address is associated with the guest's computer while it remains connected to the IRM.

Where the transmission line connecting the IRM to the hotel network comprises a single twisted pair of conductors, the data communications between the IRM and the HEM are configured so that they may be transmitted substantially simultaneously over the single twisted pair with the standard telephone signals from the phone in the guest room (206). A specific technique by which this configuration is effected is described below with reference to FIGS. 3a and 4.

Once the connection is established, the communications between the IRM and the HEM are monitored either periodically or continuously for a variety of purposes (208). This information may be used by the hotel for billing purposes or for troubleshooting and improving the reliability of the hotel network.

If an Internet transaction is requested by the guest's computer, a globally unique IP address from a pool of such addresses is temporarily associated with the network IP address currently associated with the guest's computer using, for example, a network address translation protocol (210). As discussed above, the pool of addresses could be, for example, class A, B, or C addresses. As will be discussed below with reference to FIGS. 5 and 6, the temporary association of the globally unique IP address may be done by the HEM in the hotel or, according to another embodiment, by a remote server which interconnects one or more hotel properties in a wide area network. When the Internet transaction is complete (212), the globally unique IP address is disassociated from the network IP address and put back in the pool for use in facilitating subsequent Internet transactions from any of the hotel's guest rooms (214). The network IP address remains associated with the guest's computer until the session ends, e.g., the computer is disconnected from the IRM or powered down (216).

Figure 3A:
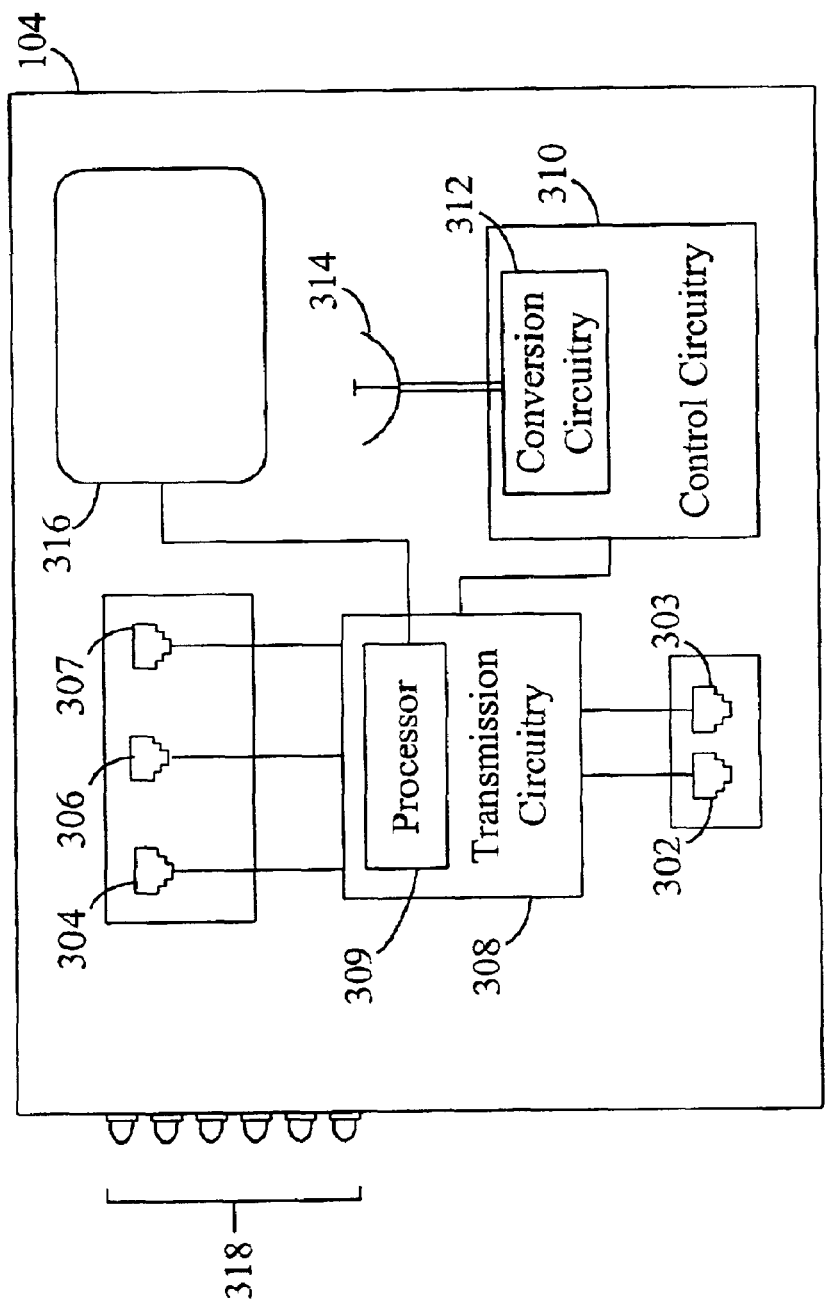
FIGS. 3a and 3b are more detailed block diagrams of the in-room module and head-end module of FIG. 1.
Figure 3B:
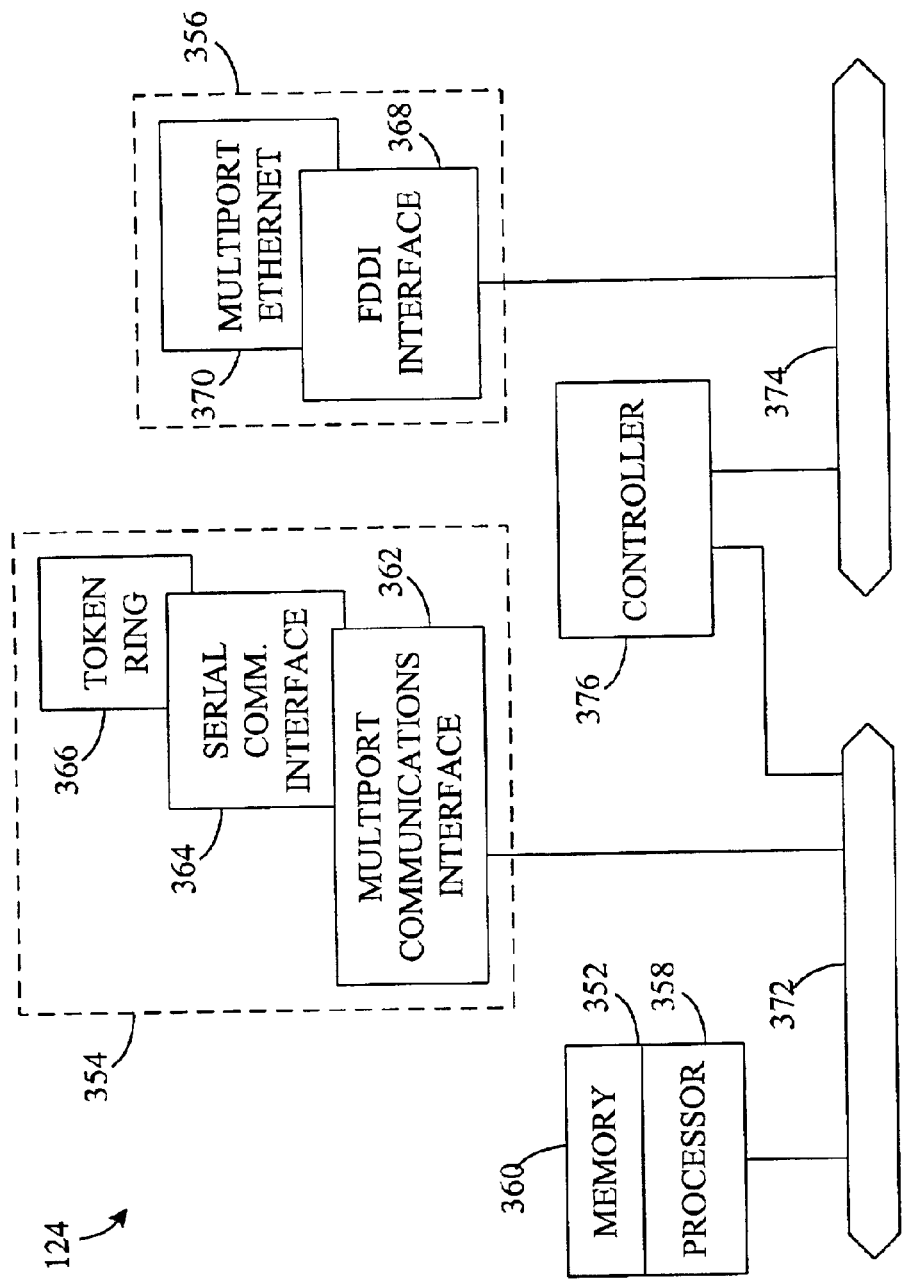

FIGS. 3a and 3b are more detailed block diagrams of IRM 104 and HEM 124 of FIG. 1, respectively. IRM 104 comprises connection circuitry for connecting the IRM to the room's standard telephone jack as well as the room's telephone and the guest's computer. According to various embodiments, the connection circuitry may include RJ-11 ports 302 for connecting to the phone and 303 for connecting to the wall jack, an Ethernet port 304, a universal serial bus (USB) port 306 for connecting to the guest's computer, and an additional data port 307 for receiving various types of data. USB port 306 may, in some instances, prove more convenient than Ethernet port 304 in that certain network reconfiguration issues don't have to be dealt with. In addition, many business travelers often don't travel with the Ethernet dongle which is necessary for connecting their laptop's Ethernet port to a network Ethernet port. Thus, IRM 104 is operable to translate the laptop's transmissions to the Ethernet standard.

Figure 4:
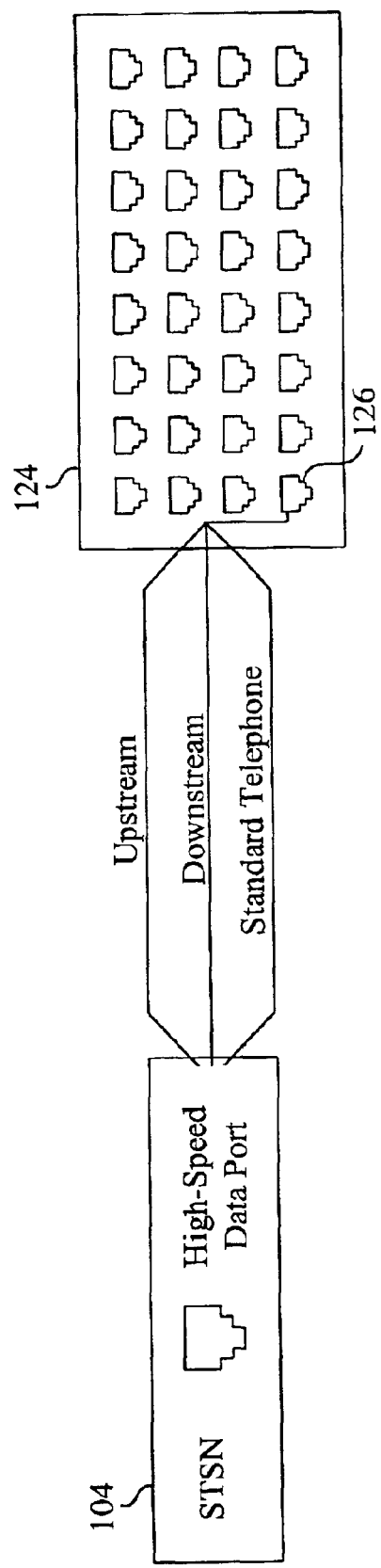
FIG. 4 is a block diagram illustrating the combination of half duplex data and standard telephone data on a single pair of conductors according to a specific embodiment of the invention.

According to a specific embodiment, IRM 104 also includes transmission circuitry 308 for transmitting and receiving data on a single twisted pair of conductors of which the majority of hotel wiring infrastructures are comprised. According to one embodiment, a portion of transmission circuitry 308 is implemented according to the home PNA (Phone-line Networking Alliance) standard which allows half duplex data and phone signals on the same line as illustrated by the diagram of FIG. 4. According to the home PNA standard, data transmissions from IRM 104 to a port 126 of HEM 124 and transmissions from the HEM to the IRM are alternated at a frequency in the range of 4–9 MHz, e.g., 7.5 MHz. Because standard phone signals exists at a relatively low frequency compared to the home PNA modulation frequency, all of the signals may easily exist on a single pair of wires.

According to a specific embodiment, transmission circuitry 308 is operable to associate the network IP address associated with IRM 104 with the guest's computer. That is, the address translation or assignment which allows the guest access to the local or wide area network is performed by the transmission circuitry in the IRM. According to a more specific embodiment, transmission circuitry 308 includes a processing unit 309 based on RISC microprocessor which performs the address translation, the combining and separation of signals for transmission to the headend, and the routing of the received signals to the appropriate IRM port. According to a specific embodiment, processing unit 309 comprises an Intel 80960VH and the appropriate support circuitry.

According to another specific embodiment, IRM 104 also includes control circuitry 310 for receiving control information via the hotel's network for controlling one or more control systems 311 proximate to the IRM. Such control systems may include, for example, the room's temperature control, lighting, and audio systems. In one embodiment, the control circuitry includes conversion circuitry 312 for converting the received control information into the necessary control signals for actually controlling the in-room control systems. The conversion circuitry may include, for example, an RF transmission element 314 (e.g., an antenna) for transmitting RF control signals to the various control systems. According to an alternative embodiment, conversion circuitry 312 includes an infrared transmission element (e.g., an IR diode) for transmitting infrared control signals to various control systems.

Transmission circuitry 308 (using processor 309) discriminates between the various data it receives and directs it to the appropriate port on IRM 104 according to address information in data packet headers. According to a specific embodiment, digital audio and video may be transmitted to individual rooms via the system described herein. The digital audio and video are directed to additional data port 307 to which an audio and/or video system may be connected for presenting the transmitted content. In this way, an ambience may be set for the guest's arrival. In addition, the guest could select a wide variety of entertainment and information services via the hotel network which may then be transmitted to the guest's room via the auxiliary data port 307 on IRM 104.

Specific embodiments of IRM 104 also include an LED or LCD display 316 on which status and other information may be communicated to the occupant of the guest room whether or not they are currently connected. For example, before a connection is made, display 316 could be used to inform the hotel guest of all of the services available through IRM 104 as well as instructions for connecting to IRM 104. Other information such as stock quotes and weather information may also be presented continuously or periodically. Once connected, display 316 could communicate the status of the connection as well as the time connected and current connection charges. It will be understood that a wide variety of other information may be presented via display 316.

IRM 104 may also include an array of individual colored LEDs 318 which provide information to the user. Such LEDs may indicate, for example, the connection status of the IRM, i.e., whether it is connected to the HEM, using red or green LEDs. LEDs 318 may also be configured to indicate a purchase status to the user. That is, because connection services are often purchased in 24 hour blocks, LEDs 318 may indicate to the user whether she is operating within a block of time which has already been paid for (green), whether the end of the current block is approaching (yellow), or whether she has already entered the next time block (red). LEDs 318 could also indicate which type of connection the user has established, e.g., USB or Ethernet.

As mentioned above and as shown in FIG. 3b, HEM 124 may be thought of as an enhanced router which routes data packets to and from IRMs 104, controls network access, serves as a bridge for Ethernet data transmitted over the hotel's single twisted pair infrastructure, and, according to some embodiments, handles address translation and assignment. According to various embodiments, the functionalities of HEM 124 may be implemented using functionalities available in, for example, a 2611 router and a Catalyst 2900 Ethernet switch from Cisco Systems, Inc. HEM 124 includes a master central processing unit (CPU) 352, low and medium speed interfaces 354, and high-speed interfaces 356. When acting under the control of appropriate software or firmware, the CPU 352 is responsible for such router tasks as routing table computations and network management. It may also be responsible for controlling network access and transmissions, etc. It preferably accomplishes all these functions under the control of software including an operating system (e.g., the Internet Operating System (IOS®) of Cisco Systems, Inc.) and any appropriate applications software. CPU 352 may include one or more microprocessor chips 358. In a specific embodiment, a memory 360 (such as non-volatile RAM and/or ROM) also forms part of CPU 352. However, there are many different ways in which memory could be coupled to the system.

The interfaces 354 and 356 are typically provided as interface cards (sometimes referred to as "line cards"). Generally, they control the sending and receipt of data packets over the network and sometimes support other peripherals used with HEM 124. The low and medium speed interfaces 354 include a multiport communications interface 362, a serial communications interface 364, and a token ring interface 366. The high-speed interfaces 356 include an FDDI interface 368 and a multiport Ethernet interface 370. Preferably, each of these interfaces (low/medium and high-speed) includes (1) ports for communication with the appropriate media, (2) an independent processor, and in some instances (3) volatile RAM. The independent processors control such communications intensive tasks as packet switching, media control and management. By providing separate processors for the communications intensive tasks, this architecture permits the master microprocessor 352 to efficiently perform routing computations, network diagnostics, security functions, etc.

The low and medium speed interfaces 354 are coupled to the master CPU 352 through a data, control, and address bus 372. High-speed interfaces 356 are connected to the bus 372 through a fast data, control, and address bus 374 which is in turn connected to a bus controller 376.

Although the system shown in FIG. 3b is one type of router by which the present invention may be implemented, it is by no means the only router architecture by which the present invention may be implemented. For example, an architecture having a single processor that handles communications as well as routing computations, etc. would also be acceptable. Further, other types of interfaces and media could also be used with the router.

Regardless of network device's configuration, it may employ one or more memories or memory modules (including memory 360) configured to store program instructions for the network operations and network access and control functions described herein. The program instructions may specify an operating system and one or more applications, for example. Such memory or memories may also be configured to store, for example, control information for controlling in-room control systems, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Referring back to FIG. 3b, HEM 124 has a plurality of ports 126 each of which communicates with a corresponding IRM 104. HEM 124 has the ability to sense when any of ports 126 are being used so that the hotel may bill the user accordingly. This monitoring feature is also useful for technical support, network bandwidth requirement estimates, billing estimates, and buying pattern data. HEM 124 also has the capability of enabling and disabling individual ports 126. Where network 100 is part of a wide area network (as discussed below), the monitoring, enabling, and disabling of ports 126 may be done from a remote server at the center of the WAN.

As described above, each HEM port 126 (and thus the corresponding IRM 104) has a fixed IP address which may be configured using any of a variety of network management protocols such as, for example, SNMP. The fixed IP address of the HEM port 126 and the IRM 104 is assigned to the guest's computer using DHCP. Alternatively, an address translation is performed between the computer's internal IP address and the fixed IP address of IRM 104/HEM port 126. HEM 124 has a small boot ROM 378 for basic IP communications and a large flash ROM 380 for fully functional software and configuration data. This allows for remote software upgrades using, for example, an encrypted protocol riding on top of IP.

According to various embodiments, HEM 124 also comprises transmission circuitry 316 for transmitting and receiving data on a single twisted pair of conductors. Thus, the Ethernet data which has been combined with the standard telephone signals at IRM 104 may be picked off and reconfigured for transmission according to standard Ethernet techniques. Also, data headed to IRM 104 may be combined for transmission over the single twisted pair. As with transmission circuitry 308, transmission circuitry 316 may be implemented according to the home PNA standard.

Figure 5:
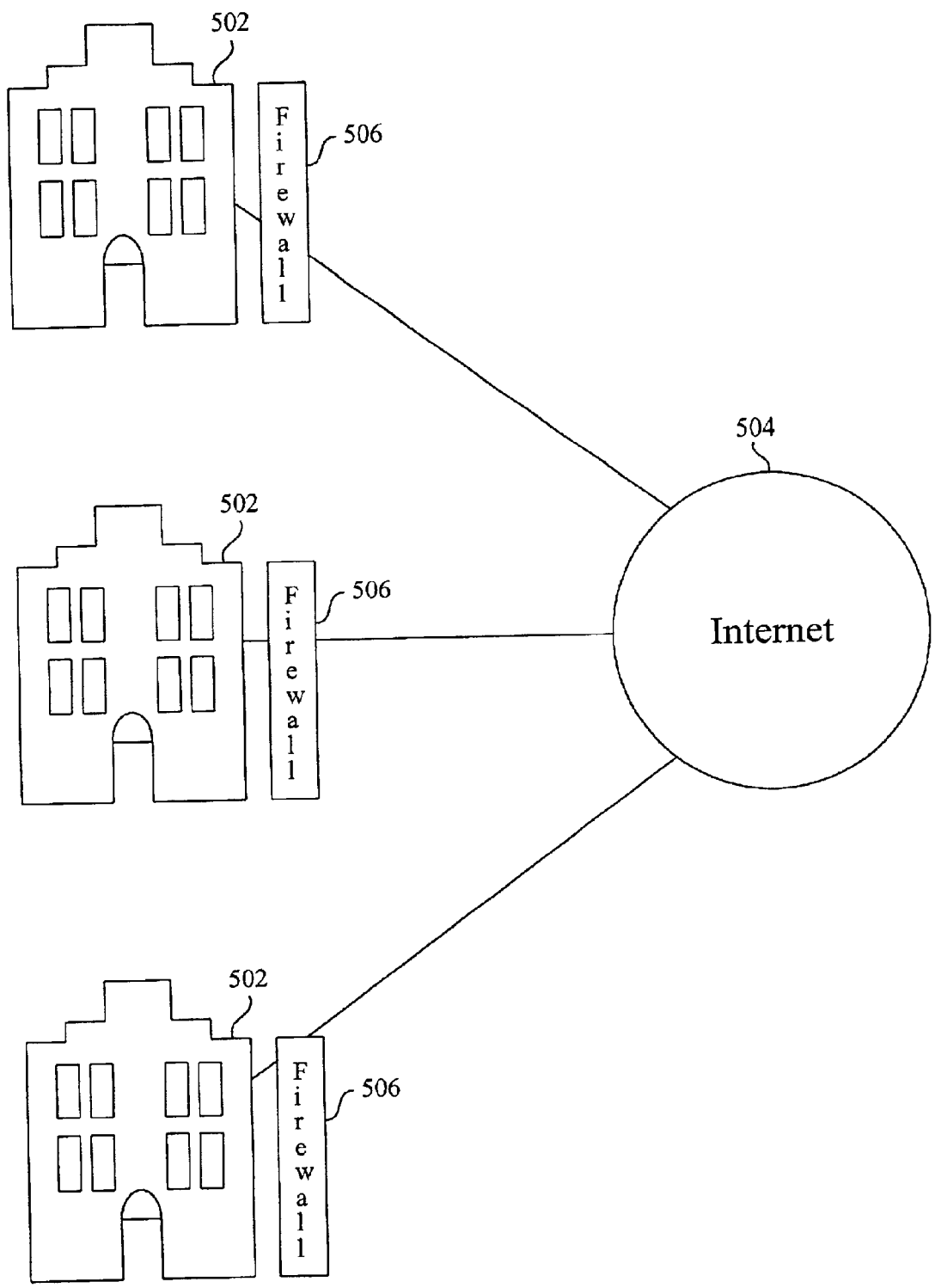
FIG. 5 is a block diagram illustrating the provision of high speed data and Internet access to guest rooms in hotels according to another specific embodiment of the invention.

FIG. 5 is a block diagram illustrating the provision of high speed data and Internet access to guest rooms in a chain of hotels 502 according to one embodiment of the invention. Using the internal infrastructure described above with reference to FIG. 1, each hotel 502 has a local area network (LAN) (not shown) which provides direct access to the Internet 504 for each of its guest rooms. According to this embodiment, each hotel 502 must provide its own security in the form of a firewall 506 for the protection of its LAN.

Figure 6:
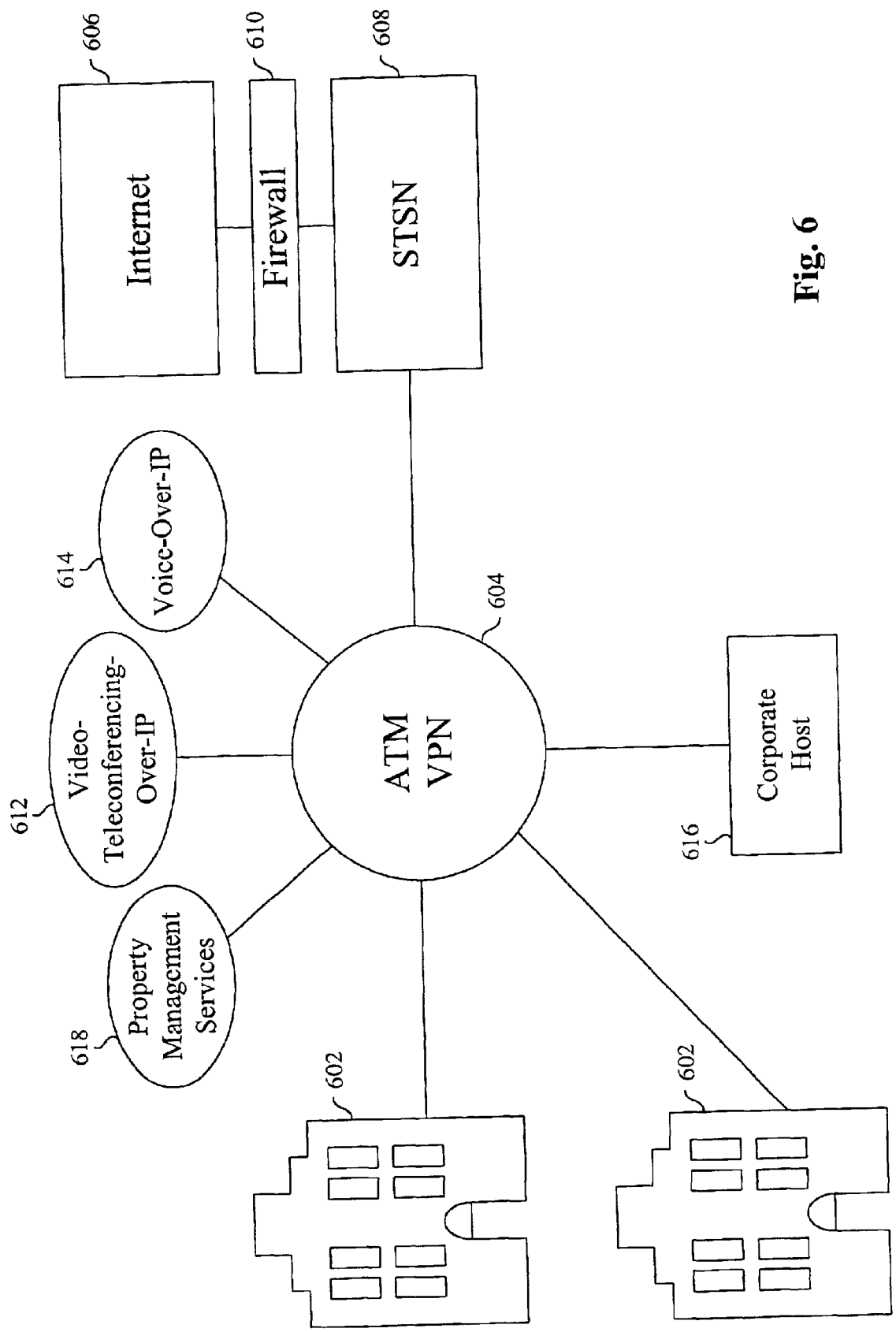
FIG. 6 is a block diagram illustrating the provision of high speed data and Internet access to guest rooms in hotels according to yet another specific embodiment of the invention.

FIG. 6 is a block diagram illustrating the provision of high speed data and Internet access to guest rooms in a chain of hotels 602 according to another embodiment of the invention. Using the internal infrastructure described above with reference to FIG. 1, each hotel 602 has a LAN (not shown) which is then connected with other LANs in the other hotels 602 to form a wide area network (WAN) referred to herein as a virtual private network (VPN) 604. According to a specific embodiment, VPN 604 is built on an optical fiber backbone employing asynchronous transfer mode (ATM) technology to transmit data packets. It will be understood however that any of a variety of transmission protocols and infrastructures may be employed to transmit data in such a network without departing from the scope of the present invention. Such protocols may include but are not limited to frame relay, Ethernet, and FDDI. Data are configured in the appropriate format as they leave each hotel 602 by a framer (not shown) which may be part of or associated with each hotel's router or file server.

The embodiment of FIG. 6 provides several advantages over the embodiment described above with reference to FIG. 5. High speed access to the Internet requires some form of connection to the Internet such as, for example, a T1 or T3 line. Not only does such a connection require a hardware infrastructure to support it, it also necessitates some form of protection for the network in the form of, for example, a firewall. Thus, if each hotel property in a hotel chain were to be directly connected to the Internet (as shown in FIG. 5), each property would need to have its own network hardware infrastructure, firewall, and the technical and administrative staff and functions to support the same. By contrast, with VPN 604, access to the Internet 606 is provided via a single network center (represented by remote network operation center (NOC) server 608) at which one or more firewalls 610 and any other necessary networking hardware and equipment may be located and managed. According to a specific embodiment, a redundant network center is provided in a different city than the first against the event that one or the other goes down.

Having each hotel property directly connected to the Internet is problematic for effecting control of the hotels from a central location. That is, the more each hotel LAN is amenable to control from a central location, the more vulnerable it is to hacking. With VPN 604, security is complete and centralized control is virtually unlimited. This makes things like remote software upgrades convenient thus eliminating what might otherwise be significant field service costs. In addition, because much of the equipment is centrally located, the costly redundancy of equipment and support functions at each hotel property made necessary by the embodiment of FIG. 5 is avoided.

Another important benefit of VPN 604 relates to the management of globally unique IP addresses. As mentioned above, there is a paucity of pools of globally unique IP addresses which are sufficiently large to accommodate each host on the networks of most medium to large size organizations. For example, one pool of class C addresses accommodates less than 256 simultaneous users on a network. This might be sufficient at most hotels much of the time, but it is clear that there are foreseeable circumstances where it would not be. For example, as mentioned above, if a 1200 room hotel hosted an Internet technologies seminar it is highly likely that such a pool of addresses would not be sufficient. In addition, this scenario makes the assumption that each property in a hotel chain (some comprising over 1000 properties) could procure a pool of class C addresses.

VPN 604 addresses this problem in that it spreads the IP address needs of each of the hotel properties over the resources of the entire wide area network. Thus, for example, a single class B pool of addresses might be used to accommodate all of the Internet access needs of an entire hotel chain even where the total number of rooms in the chain far exceeds the number of available globally unique IP addresses. That is, large bursts of IP address needs may occur simultaneously at dozens of the hotel properties without exhausting the nearly 64,000 globally unique addresses available in the class B pool.

Other secure services may also be provided via VPN 604. For example, video teleconferencing-over-IP 612 and voice-over-IP communications 614 may be provided to hotel guests. Moreover, by arranging access to VPN 604 by corporate hosts 616, individual employees of those corporations can have secure access to their employer's network from remote locations. Other services such as, for example, property management services 618 may be provided to the management of hotels 602.

According to a specific embodiment, the processing power of the in-room module of the present invention, e.g., IRM 104 of FIG. 3*a*, is employed to effect a variety of advanced IP and HTML processing functions. According to various embodiments, such functions may relate to the monitoring, tagging, and redirection of network traffic. One such function relates to the manner in which web sites and portals track the source of traffic referred to their sites.

Many e-commerce web sites offer a share of their revenues to sites which refer user traffic. These referrals are typically accomplished through links to the e-commerce sites embedded in the pages of the referring site. Traffic referred by such mechanisms typically includes an affiliate tag identifying the referring site. It is through the use of affiliate tags that the target e-commerce sites track the source of referred traffic and determine the compensation owed the various referring affiliate sites.

One shortcoming of the above-described approach relates to the fact that the revenue opportunity may be lost by the referring site if the user employs some other mechanism than the provided link to access the target site. For example, if the user simply types the target site URL directly into his browser, the request is not tagged as originating from the affiliate site, even where the linking page of the affiliate site is currently being viewed by the user. Therefore, according to a specific embodiment of the invention, the IRM is configured to monitor requests originating from the associated computer and add affilitate link ID tags to appropriate requests whether they originated from selection of a hyperlink or direct typing of the URL.

More generally, the IRM of the present invention may be configured to monitor the traffic originating from the connected host and process the request in accordance with a predetermined protocol depending on the nature of the traffic being monitored. That is, because of the processing power in the IRM and the fact that only one computer is typically associated with each IRM, the traffic associated with the computer can be analyzed in very detailed ways, far more detailed in fact than is practicable for the traffic flowing through a typical network node, e.g., a router, which may correspond to hundreds or even thousands of user.

Figure 7:
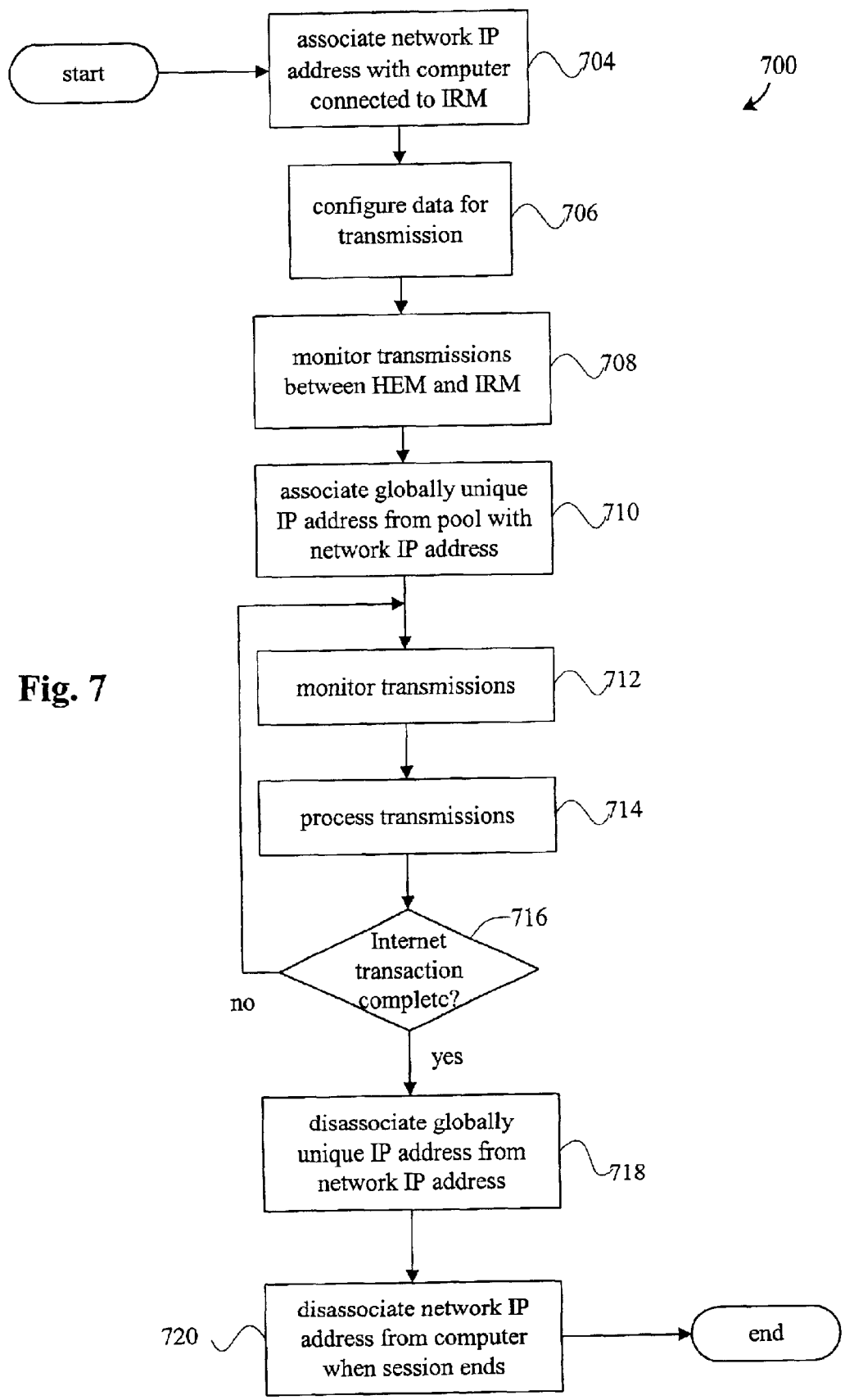
FIG. 7 is a flowchart illustrating providing network access and the selective processing of data transmissions according to a specific embodiment of the present invention.

FIG. 7 is a flowchart 700 illustrating another method for providing high speed data and Internet access to guest rooms in a hotel using the system of FIG. 1. When a guest's computer connects to an IRM in any one of the guest rooms, the network IP address associated with that IRM is associated with the computer (704). As discussed above, this association could mean a DHCP assignment of the network IP address to the guest's computer where the computer did not already have an internal IP address. It could also mean that the internal IP address of the computer is translated into the network IP address. This address assignment/translation may be effected by either of the IRM and the HEM. In addition, it will be understood that depending on where the assignment/translation occurs it may precede or follow 706 described below. The network IP address is associated with the guest's computer while it remains connected to the IRM.

The data from the guest's computer are then configured for transmission over the hotel wiring infrastructure (706). So, for example, where the transmission line connecting the IRM to the hotel network comprises a single twisted pair of conductors, e.g., a standard phone line, the data communications between the IRM and the HEM are configured so that they may be transmitted substantially simultaneously over the single twisted pair with the standard telephone signals from the phone in the guest room. This may be accomplished, for example, using standard well know DSL techniques. Alternatively, where the hotel is more up-to-date and includes a network communications infrastructure, the data may be transmitted according to any of a wide variety of network transmission protocols, e.g., Ethernet.

Once the connection is established, the communications between the IRM and the HEM are monitored either periodically or continuously for a variety of purposes (708). This information may be used by the hotel for billing purposes or for troubleshooting and improving the reliability of the hotel network.

If an Internet transaction is requested by the guest's computer, a globally unique IP address from a pool of such addresses is temporarily associated with the network IP address currently associated with the guest's computer using, for example, a network address translation protocol (710). As discussed above, the pool of addresses could be, for example, class A, B, or C addresses. As will be discussed above with reference to FIGS. 5 and 6, the temporary association of the globally unique IP address may be done by the HEM in the hotel or, according to another embodiment, by a remote server which interconnects one or more hotel properties in a wide area network.

The data transmissions to and from each computer connected to each IRM may be monitored to effect a variety of functions (712). That is, because of the processing power available at the IRM, these data transmissions may be evaluated on any network protocol level, e.g., right down to an HTML string, to determine, for example, the destination to which the transmissions are directed or from which the transmissions originated. This information may then be used to process the transmissions in a wide variety of ways ranging from very simple to highly sophisticated (714).

Because of the processing power available in the IRM, the monitoring of the transmissions from the guest's computer may be accomplished with varying levels of sophistication. That is, information about these transmissions may be determined by evaluating the transmissions on any network communication protocol layer, i.e., from the physical to the application layer. So, for example, the IRM could identify the port to which a transmission is directed, e.g., port 80, by referring to the network layer. Alternatively, the IRM could identify the web site to which a transmission is directed by looking at the HTML string in a request. As will be understood, the possible ways in which the transmission may be monitored are limited only by the number of types of transmissions which could originate from or be directed to the guest's computer.

The way in which the transmissions may then be processed are similarly diverse. For example, if the transmissions are monitored to determine the destination of a web request, this information may be used in a variety of ways. Again for example, where an affiliate agreement exists between the destination site and the provider of the network services of the present invention, an affiliate tag may be associated with the transmissions to the destination site. This may be accomplished by appending the affiliate tag to the HTML string designating the destination site.

Alternatively, the information about the destination site could be employed to effect the generation of pop-up windows or the framing of web pages on the guest's computer with content relating in some way to the destination site. The content of such a frame or window might relate to the business of the destination site or that of a competitor. That is, if the computer user sends a request to the Coca-Cola® web site, the returned web pages could be displayed with a promotional offer from Coca-Cola® or an advertisement from Pepsi®.

The processing of the data transmission, whether it relates to tagging, framing, or some other type of processing may occur in the IRM itself, or may alternatively be accomplished at another network node (e.g., the HEM, or a local or remote server) by having the IRM redirect at least a portion of the transmissions through the processing node. So, for example, if the processing function relates to framing of web pages from specific destination sites, where transmissions from the guest computer are determined to be going to such a site, they may be redirected to the processing node which connects with the destination site and frames the pages it receives in response for presentation on the guest computer.

In general, it will be understood that the above-described examples of the monitoring and processing of transmissions to and from the guest computer are merely exemplary and that the present invention encompasses a great diversity of both functions.

Referring back to FIG. 7, when the Internet transaction is complete (or when a timeout period expires during which no packets are sent or received) (716), the globally unique IP address is disassociated from the network IP address and put back in the pool for use in facilitating subsequent Internet transactions from any of the hotel's guest rooms (718). The network IP address remains associated with the guest's computer until the session ends, e.g., the computer is disconnected from the IRM or powered down (720).

While the invention has been particularly shown and described with reference to specific embodiments thereof, it will be understood by those skilled in the art that changes in the form and details of the disclosed embodiments may be made without departing from the spirit or scope of the invention. For example, many of the embodiments described herein have been described with reference to hotels. It will be understood, however, that the techniques employed by the present invention may be applied to a variety of structures and institutions such as, for example, schools, office buildings, and the like. In addition, several embodiment described herein employ single twisted pair wiring which is the standard telephone wiring found in most buildings. However, it will be understood that the techniques described herein may be implemented on any of a wide variety of wiring infrastructures including, for example, Ethernet and ATM systems. Therefore, the scope of the invention should be determined with reference to the appended claims.

What is claimed is:

1. A method for providing Internet access to a first computer via a first one of a plurality of network access nodes in a network using a plurality of globally unique IP addresses, the network access nodes each having a network address associated therewith which is unique on the network, the first network access node having a first network address associated therewith, the method comprising:

associating the first network address with the first computer while the first computer is connected to the first network access node thereby providing access to the network;

associating a first one of the globally unique IP addresses with the first network address for conducting an Internet transaction;

monitoring transmissions associated with the Internet transaction to determine address information;

processing the transmissions in response to the address information; and disassociating the first globally unique IP address from the first network address upon termination of the Internet transaction, the first globally unique IP address then being available for association with any of the network addresses.

2. The method of claim 1 wherein the first computer has an internal IP address and associating the first network address with the first computer comprises translating the internal IP address of the first computer to the first network address.

3. The method of claim 1 wherein the first computer does not have an internal IP address and associating the first network address with the first computer comprises assigning the first network address to the first computer.

4. The method of claim 1 wherein associating the first globally unique IP address with the first computer comprises employing a network address translation protocol.

5. The method of claim 4 wherein the plurality of globally unique IP addresses comprises a pool comprising one of a plurality of class A, a plurality of class B, or a plurality of class C IP addresses.

6. The method of claim 1 wherein the network comprises a local area network and the associating and disassociating of the first globally unique IP address is done by a headend associated with the local area network.

7. The method of claim 1 wherein the network comprises a wide area network and the associating and disassociating of the first globally unique IP address is done by a remote server on the wide area network.

8. The method of claim 1 wherein associating the first network address with the first computer is done by the first network access node.

9. The method of claim 1 wherein portions of the network comprise a single pair of conductors, the method further comprising transmitting half duplex data and standard telephone signals substantially simultaneously over the single pair of conductors.

10. The method of claim 9 wherein transmitting the half duplex data comprises transmitting the half duplex data at a first frequency which is significantly higher than a second frequency at which the standard telephone signals are transmitted.

11. The method of claim 1 wherein monitoring and processing the transmissions is done by the first network access node.

12. The method of claim 1 wherein monitoring the transmissions comprises parsing an HTML string associated with the transmissions.

13. The method of claim 1 wherein monitoring the transmissions comprises monitoring network layer information associated with the transmissions.

14. The method of claim 1 wherein monitoring the transmissions comprises monitoring any of a plurality of network communication protocol layers associated with the transmissions.

15. The method of claim 1 wherein processing the transmissions comprises associating an affiliate tag with the transmissions where the transmissions correspond to an affiliate.

16. The method of claim 15 wherein associating the affiliate tag comprises appending the affiliate tag to an HTML string associated with the transmissions.

17. The method of claim 1 wherein processing the transmissions comprises generating content for presentation on the first computer.

18. The method of claim 17 wherein the transmissions relate to a first entity, the content also relating to the first entity.

19. The method of claim 17 wherein the transmissions relate to a first entity, the content relating to a second entity in competition with the first entity.

20. The method of claim 17 further comprising presenting the content on the first computer in a pop-up window.

21. The method of claim 17 further comprising presenting the content on the first computer in a frame around at least one HTML page corresponding to the transmissions.

22. The method of claim 1 wherein processing the transmissions comprises redirecting the transmissions to a server to be processed.

23. The method of claim 22 wherein processing the transmissions comprises framing HTML pages to be presented on the first computer.

24. The method of claim 22 wherein processing the transmission comprises generating a pop-up window to be presented with HTML pages on the first computer.

25. A method for providing Internet access to a first computer via a first one of a plurality of network access nodes in a plurality of networks using a plurality of globally unique IP addresses, the network access nodes each having a network address associated therewith which is unique among the plurality of networks, the first network access node having a first network address associated therewith, the method comprising:
  interconnecting the plurality of networks with a remote server thereby forming a wide area network, the globally unique IP addresses being associated with the remote server;
  associating the first network address with the first computer while the first computer is connected to the first network access node;
  associating a first one of the globally unique IP addresses with the first network address for conducting an Internet transaction;
  monitoring transmissions associated with the Internet transaction to determine address information;
  processing the transmissions in response to the address information; and
  disassociating the first globally unique IP address from the first network address upon termination of the Internet transaction, the first globally unique IP address then being available for association with any of the network addresses.

* * * * *